Patented Sept. 2, 1941

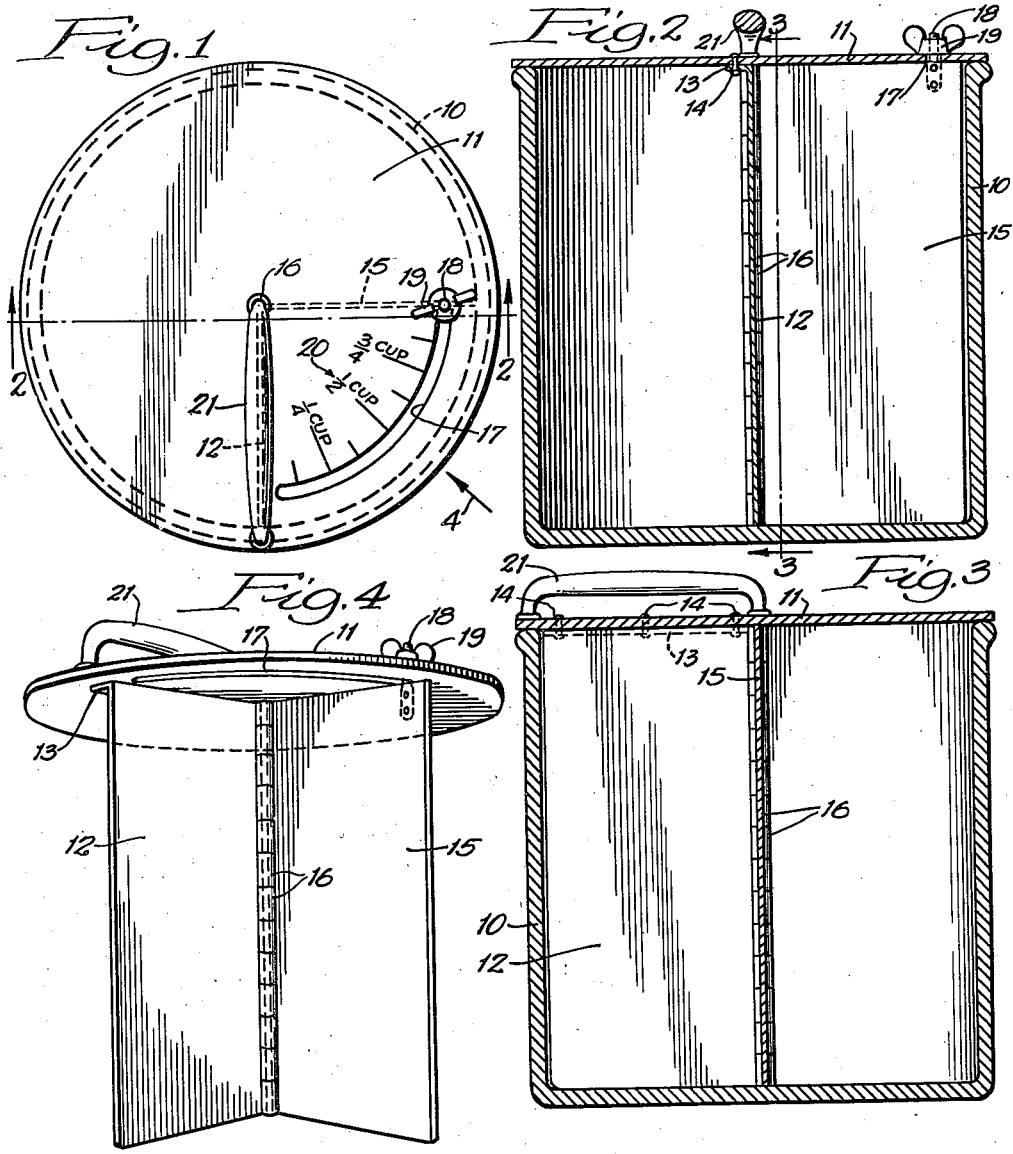

2,254,763

UNITED STATES PATENT OFFICE 2,254,763

MEASURING AND CUTTING DEVICE

Benjamin J. Wolfe, Chicago, Ill.

Application June 11, 1941, Serial No. 397,564

5 Claims. (Cl. 31—11)

This invention relates to a device designed for use by housewives and cooks for cutting and dispensing sectors of such semi-solid and easily cut foods as butter, cheese, lard and the like of accurately measured volumes from cylindrical jars in which such foods are to a large extent packed and distributed to the retail trade. Many cooking recipes call for a certain volume of butter, cheese, lard or the like, such as a cupful, half cup, quarter cup, etc.; and where the material comes packed solid in a jar or can, many cooks will dish it out with a large spoon, guessing at the amount served and often making a poor guess and extracting more or less than the exact amount called for by the recipe.

One object of this invention is to provide a device for eliminating this guesswork, and enabling the cook to readily cut and extract from a cylindrical jar or can a sector of the cooking ingredient of just the volume called for by the recipe. Another object is to provide, as a part of such measuring device, an element that will rest upon and serve as a cover for the jar or can to protect the contents from dust and dirt, and will also serve as a volume indicator, a suspensory support for the cutter blades, and an element of a clamp for securing the cutter blades in any angularly adjusted position.

Still another object is to provide a device of the character described that can be produced so cheaply that it can be given away, as an advertisement or sales inducement, by purveyors of the packaged goods to their customers.

An illustrative embodiment of the invention is shown in the accompanying drawing, in which—

Fig. 1 is a top plan view of the device mounted on a cylindrical jar which may be assumed, for example, to be packed full of butter.

Fig. 2 is a vertical section taken on the line 2—2 of Fig. 1.

Fig. 3 is a vertical section in a plane at right angles to that of Fig. 2, taken on the line 3—3 of Fig. 2.

Fig. 4 is a perspective view of the device out of the jar, looking in the direction of the arrow 4, Fig. 1.

In all of the views the two cutter blades are shown as set 90 degrees apart, in a position to cut out a sector having a volume equal to that of one cup, as shown by the scale on the cover.

In the drawing, 10 designates a cylindrical open top jar of a kind extensively used by dairies and other purveyors of food products for the packaging and distribution of butter, cheese and the like. 11 designates a flat disc preferably having a diameter substantially equal to the external diameter of the top of the jar and adapted to rest, as a lid or cover, on the top edge of the jar. Attached to the underside of the disc 11 is a fixed cutter blade 12, said blade being preferably attached to the cover by means of a top rectangular flange 13 and rivets 14. 15 designates an angularly movable blade of the same size as the fixed blade 12, the adjacent vertical edges of the two blades being connected by a piano hinge 16. It will be observed that each of the blades has a length equal to the full internal depth of the jar and a width equal to an internal radius of the jar, so that the outer vertical edges of both blades have loose sliding contact with the vertical cylindrical wall of the jar and their bottom edges have similar contact with the bottom wall of the jar.

In the disc 11 is an arcuate slot 17 struck from the center of the disc. Mounted on the top edge portion of the movable blade 15 is a vertical stud 18 that projects through the slot 17 and is threaded on its upper end to receive a wing-nut 19 by which the movable blade 15 can be clamped to the disc in any angularly adjusted position.

One edge of the slot 17 has a scale 20 graduated in fractions of a volumetric measure, such as a cup. If the cook's recipe calls for a cup of butter, the movable blade 15 is swung to the position indicated in the drawing and secured in that position by tightening the clamp nut 19. The device is then inserted into the jar 10 with the outer edges of the blades 12 and 15 in sliding contact with the vertical wall of the jar, and pressed down until the lower edges of the blades are in contact with the bottom wall of the jar. The device is then withdrawn from the jar, for which purpose a handle 21 is preferably mounted on the disc 11, and will usually bring with it the excised sector of butter or other ingredient of the recipe. The volume of this sector will, in the case assumed, just equal the volume of a cupful of butter. If a smaller amount is called for, the movable blade will be adjusted to the position on the scale indicating such smaller amount and clamped in position, and the described operation of cutting and withdrawing the sector follows. And, since the withdrawn portions are true sectors of the entire body of butter, or other material in the jar, there is no waste of material involved in the use of the device.

Manifestly, after one or more sectors have been cut and withdrawn, the device can be reinserted into the jar, where the disc 11 serves as a cover to protect the contents from dust and dirt. The device can be easily cleaned, when not required for use, and is of such simple and inexpensive structure that the purveyors of the products with which it is used can afford to give it away as an advertisement to present and prospective customers of their products.

I claim:

1. In a device of the class described, the combination of a plate adapted to rest on and cover the upper end of a jar, said plate equipped with a volume indicating scale, a fixed blade of a height equal to the depth of the jar, secured to and depending from the under side of said plate, an angularly movable blade of the same size as said fixed blade hinged to the inner edge of the latter, said movable blade carrying a member cooperating with said scale, and means for securing said movable blade to said cover in any angularly set position as shown by said scale.

2. In a device of the class described, the combination of a flat disc adapted to rest on and cover the upper end of a cylindrical jar, said disc equipped with a volume indicating scale, a fixed blade of a height equal to the depth of the jar and a width equal to an internal radius of the jar secured to and depending from the under side of said disc radially of the latter, an angularly movable blade of the same size as said fixed blade hinged to the inner edge of the latter, said movable blade carrying a member cooperating with said scale, and means for clamping said movable blade to said disc in any angularly set position as shown by said scale.

3. In a device of the class described, the combination of a flat disc adapted to rest on and cover the upper end of a cylindrical jar, said disc having an arcuate slot struck from the center of the disc and a volume scale on an edge of said slot, a fixed blade of a height equal to the depth of the jar and a width equal to an internal radius of the jar secured to and depending from the under side of said disc radially of the latter, an angularly movable blade of the same size as said fixed blade hinged to the inner edge of the latter, an upstanding stud on the upper edge of said movable blade projecting through said slot and cooperating with said scale to indicate the volume of the sector excised by said blades, and means for clamping said movable blade to said disc in any angularly set position.

4. An embodiment of the invention defined in claim 3, wherein the fixed blade is formed with a flange on its upper edge lying in contact with and secured to the disc.

5. An embodiment of the invention defined in claim 3, wherein the stud on the upper edge of the movable blade is threaded and equipped with a nut adapted to be turned down into clamping engagement with the upper surface of the disc.

BENJAMIN J. WOLFE.